United States Patent [19]
Liu et al.

[11] Patent Number: 6,146,736
[45] Date of Patent: Nov. 14, 2000

[54] MAGNETIC DISK LANDING ZONE AND METHOD FOR MAKING

[75] Inventors: Jia J. Liu; Wenjun Li, both of Fremont, Calif.

[73] Assignee: Hyundai Electronics America, Inc., San Jose, Calif.

[21] Appl. No.: 09/063,880

[22] Filed: Apr. 21, 1998

[51] Int. Cl.[7] ...................................................... G11B 5/66
[52] U.S. Cl. .................. 428/65.3; 428/141; 428/694 TR; 428/694 SG; 428/694 BR; 428/900; 427/129; 427/130; 427/555; 427/596
[58] Field of Search ...................... 428/694 SG, 694 BR, 428/694 TR, 141, 900, 65.3; 427/129, 130, 555, 596

[56] References Cited

U.S. PATENT DOCUMENTS

| | | | |
|---|---|---|---|
| 5,108,781 | 4/1992 | Ranjan | 427/53.1 |
| 5,635,269 | 6/1997 | Weir | 428/65.3 |
| 5,768,076 | 6/1998 | Baumgart | 360/135 |

OTHER PUBLICATIONS

D. Baumgart, et al, "Safe Landings: Laser texturizing of high–density magnetic disks", Reprint from Mar. 1996 edition of Data Storage.

D. Kuo et al., "Design of Laser Zone Texture for Low Glide Media", *IEEE Trans on Magnetics*, vol. 32, No. 5, Sep. 1996, pp. 3753–3758.

P. Baumgart et al., "Safe Landings: Laser texturing of high–density magnetic disks", Reprint from Mar. 1996 edition of *Data Storage*, four pages.

*Primary Examiner*—Leszek Kiliman
*Attorney, Agent, or Firm*—Townsend and Townsend and Crew LLP

[57] ABSTRACT

A magnetic disk (2) has an improved landing zone (8) created by directing a series of effectively overlapping laser discharges onto the landing zone to create a continuous ridge (22) extending outwardly from the base surface (4) of the landing zone. The effectively overlapping discharges are typically from a series of discharges from a pulsed laser, the discharges overlapping from about 0% to about 99%. By creating a continuous ridge, a larger diameter laser beam can be used so the depth of focus is much greater than with conventional small diameter, non-overlapping, discrete laser discharges. This aids manufacturability because the larger diameter beam spots are easier to create and the greater depth of focus accommodates fluctuations in the height of the surface of the disk.

21 Claims, 4 Drawing Sheets

MAGNETIC DISK LANDING ZONE AND METHOD FOR MAKING

BACKGROUND OF THE INVENTION

To meet the demand for high areal density thin-film media and to improve the tribological performance of the head-disk interface, a certain amount of random or pattern roughness is applied to the surface of magnetic disks through the process of texturing. This texturing is applied to an annular head landing zone region on the surface of the magnetic disks. Texturing in the landing zone region is typically done prior to the deposition of sputtered layers.

The textured pattern can be generated through mechanical, chemical or laser techniques. The textured surface topography needs to be tightly controlled to ensure proper head-disk separation during head flying and good surface durability during head landing. Because it desired to minimize the percentage of the surface of the magnetic disk which is contacted by the head, the roughness takes the form of small discrete projections or bumps formed in the head landing zone region.

To reduce the head-disk contact area in the landing zone, the projection or bump size is minimized. This can be accomplished when the texturing is created using laser discharges by reducing the size of the laser beam which contacts the surface of the disk. Conventional laser beam spot size is usually less than 10 $\mu$m in diameter, and is typically in the 5 to 8 $\mu$m diameter range. The discharges are commonly separated by about 10 to 100 $\mu$m. However, using a small beam spot size (less than about 10 $\mu$m diameter) dramatically shortens the depth of focus of the laser beam and thus makes bump height difficult to control in the manufacturing environment. This is because the surface of the magnetic disk is not perfectly flat, but varies depending on small variations in the thickness of the magnetic disk and the degree of unevenness or waviness of the surface of the magnetic disk. Also, creating small diameter laser beams is itself somewhat difficult in a manufacturing environment.

SUMMARY OF THE INVENTION

The present invention solves problems associated with producing discrete bumps or projections on the surface of a magnetic disk using laser discharges by using a larger diameter laser beam and directing a series of effectively overlapping laser discharges onto the landing zone surface region to create a continuous ridge extending outwardly from the landing zone surface.

The effectively overlapping discharges can be from a continuous wave laser or a series of discharges from a pulse laser, the discharges overlapping from about 0% with the outer peripheries just touching, to about 99%. By using larger-diameter laser beams, such as 8 to 30 $\mu$m diameter, and more preferably 10 to 30 $\mu$m, to create the continuous ridge, the depth of focus of the laser beam is greater than with smaller-diameter laser beams to accommodate fluctuation in the height of the surface of the disk. Although the invention can accommodate larger diameter laser beams than previously commonly used, the invention can be practiced using the smaller-diameter laser beams commonly used to create the head-disk landing zone. The invention is therefore usable with a wide range of laser beam diameters, such as 2 to 30 $\mu$m.

The surface of the magnetic disk, including the landing zone region with the continuous ridge, is the preferably coated with a wear-resistant coating. For example, a magnetic overcoat layer can be applied to the surface, such as by sputtering a carbon film onto the surface.

In one embodiment, the continuous ridge is formed in a spiral pattern; other patterns, such as a series of concentric circular patterns or discrete straight or curved segment patterns, can be used. Crossing patterns, such as a number of offset spiral or circular patterns, could also be used. The laser discharges are preferably controlled, pulsed laser discharges which produce a basic V-shaped crater. If the laser beam is a continuous wave laser beam, as opposed to a pulsed laser beam, the continuous ridge formed is typically similar to that formed when laser pulses overlap by about 90%; the configuration of the continuous ridge formed depends on several factors, in particular the speed of movement of the substrate. In general, the greater the overlap, the less the variation in the height in the continuous ridge.

The present invention permits formation of a contact structure which is very small so to improve tribological performance while enhancing the ease of manufacture because of the greater depth of focus than used with conventional laser texturing methods.

Other features and advantages will appear from the following description in which the preferred embodiments have been set forth in detail in conjunction with the accompanying drawings.

DESCRIPTION OF THE PREFERRED EMBODIMENTS

Figure 1:
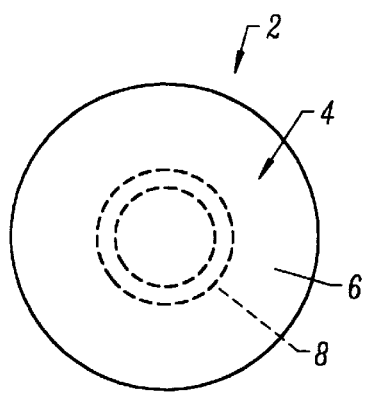
FIG. 1 is a plan view of a rigid magnetic disk with an annular head landing zone region indicated by dashed lines.

FIG. 1 illustrates a magnetic disk 2, typically a rigid magnetic disk of the type used to record and store data using hard disk drives of computers. Magnetic disk 2 has a magnetic disk surface 4, including a data region 6 and a head landing zone region 8. Head landing zone region 8 is an annular region and is commonly used to provide a dedicated region on which the head can be rested.

Figure 2:
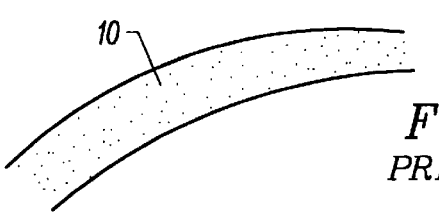
FIG. 2 illustrates, in simplified form, a prior art head landing zone region having a roughened surface created by individual bumps or other surface projections.
Figure 2A:
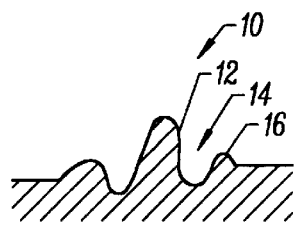
FIG. 2A illustrates a prior art surface bump of the head landing zone region of FIG. 2 created by a pulse laser creating a sombrero-shaped bump.

To reduce the friction and wear at the head/magnetic recording surface interface, region 8 of prior art magnetic disks has a roughness created by numerous projections or bumps 10 illustrated schematically in FIG. 2. One type of prior art bump is illustrated in FIG. 2A. Bump 10 is created by a pulsed laser beam forming a sombrero-shaped bump pattern. The sombrero-shaped pattern includes a central, generally cylindrical/conical portion 12 surrounded by a recessed annular region 14, the recessed region being surrounded by an annular extension 16, extension 16 being substantially shorter than central portion 12. Because it is desirable to make the diameter of central portion 12 relatively small to provide desirable tribological performance at the head/disk interface, laser beams having beam spot diameters in the range of 5 to 8 $\mu$m have commonly been used.

Figure 4:
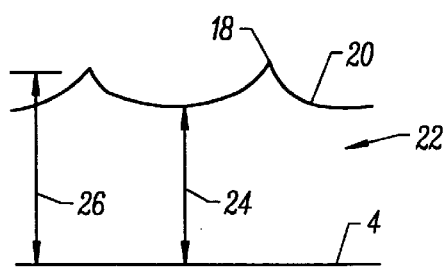
FIG. 4 is a simplified side-view illustrating the variation in the height of the continuous ridge above the base surface of the head landing zone region of FIG. 3B.
Figure 3A:
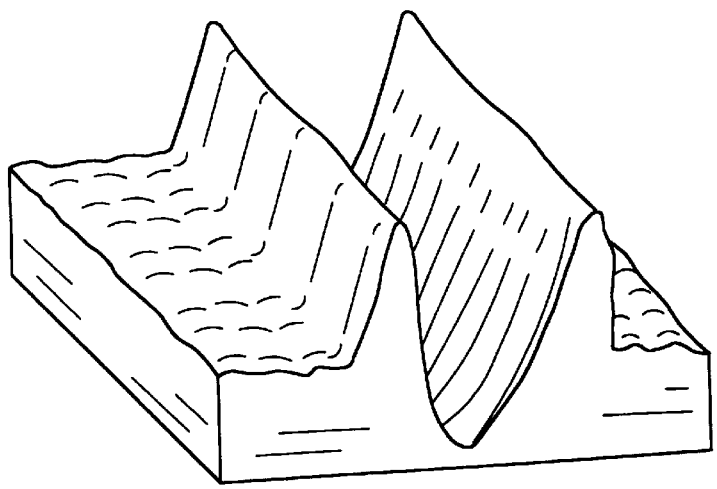
FIGS. 3A–3E illustrate five different shapes of continuous ridges extending upwardly from the head landing zone region, ridges created by a pulsed laser beam having a nominal 12 $\mu$m diameter, each laser pulse spaced-apart by 2 $\mu$m, 4 $\mu$m, 6 $\mu$m, 8 $\mu$m and 12 $\mu$m, respectively.
Figure 3B:
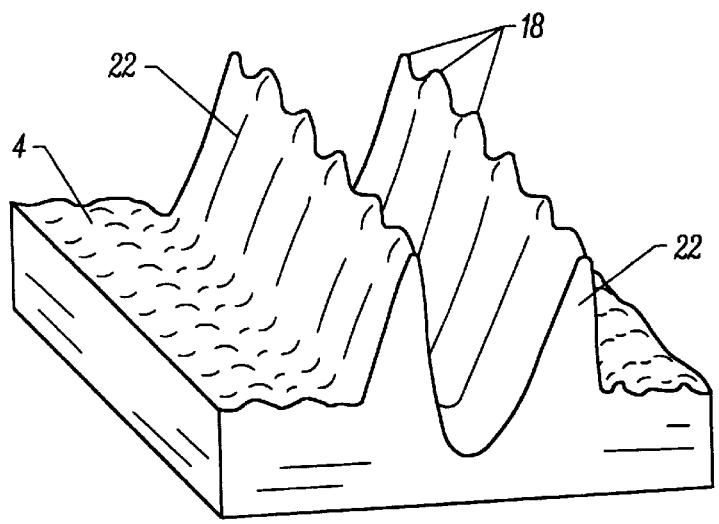

The present invention is based upon the recognition that if one were able to use laser beams having larger diameters, such as 8 to 30 $\mu$m, focusing problems, created by variations in the height of the surface of the landing zone region and associated with the smaller beam spot diameters of the prior art, would be greatly reduced. Doing so would permit the creation of head landing zone regions 8 with the desired characteristics more efficiently. This is preferably achieved by using a laser beam with a larger diameter beam spot diameter, such as 8 to 30 $\mu$m, and overlapping the laser beam discharges to create a continuous ridge forming the landing zone contact region for the head. FIGS. 3B and 4 show that landing zone contact regions 18 are the points or tips along the scalloped upper edges 20 of continuous ridges 22. Ridges 22 have a varying height, varying from a minimum height 24 to a maximum height 26, heights 24,26 measured from magnetic disk surface 4. Height 26 preferably varies from at least about 1 nm to at most about 40 nm.

Figure 3C:
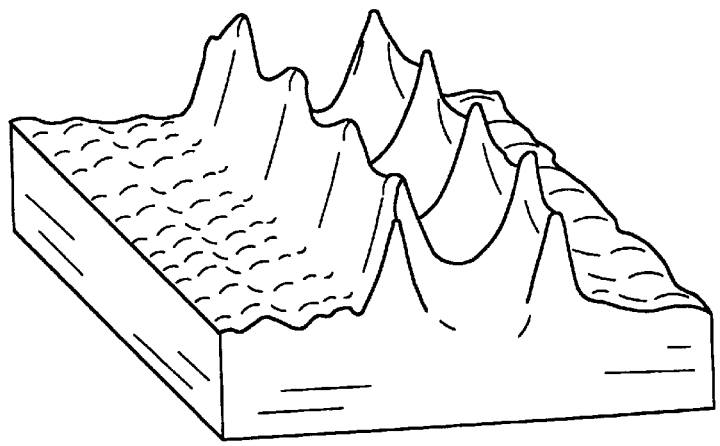
Figure 3D:
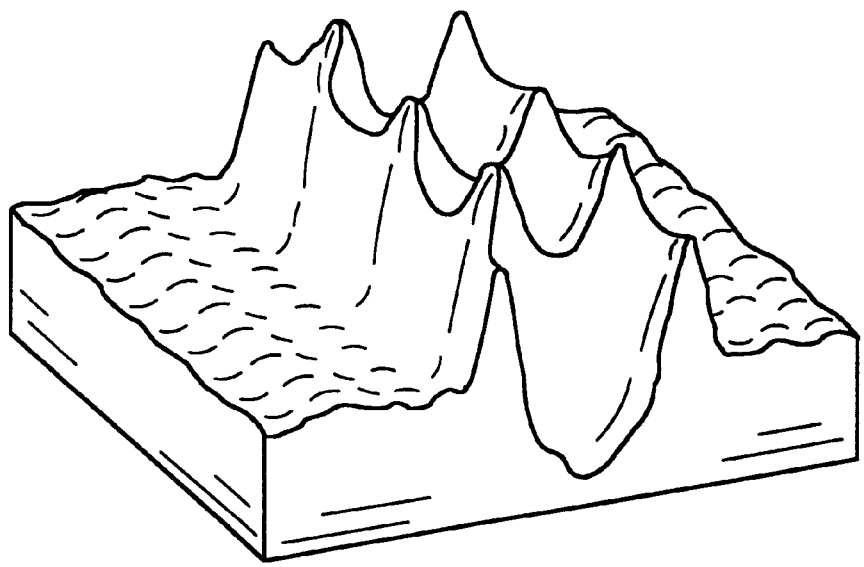
Figure 3E:
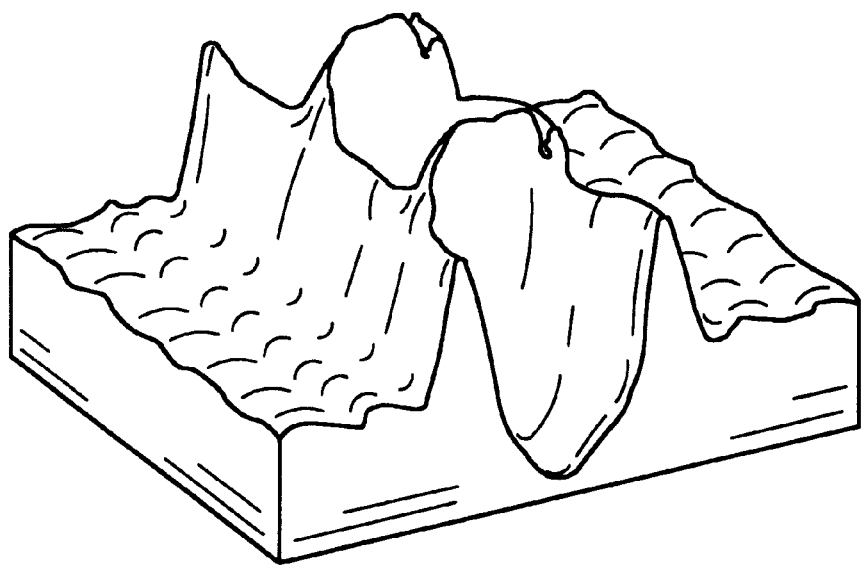

The difference between minimum and maximum heights 24, 26 typically varies according to the amount of overlap between successive laser discharges. For example, in each of FIGS. 3A–3E, the diameter of the laser beam is 12 $\mu$m. In FIG. 3A, the spacing between laser discharges is 2 $\mu$m, while in FIG. 3B, it has been increased to 4 $\mu$m. FIGS. 3C, 3D and 3E have been created using spacings of 6, 8, and 12 $\mu$m, respectively. That is, in the embodiment of FIG. 3E, the successive, adjacent laser discharges are generally tangent to one another, and thus overlap by about 0%, while in the embodiments of FIGS. 3A–3D, they overlap by about 83%, 67%, 50%, and 33% respectively. While the embodiments of FIG. 3A–3D are all similar in that they provide what are essentially two parallel continuous ridges 22 for a single line of laser discharges, continuous ridge 22a of FIG. 3E is a chain-like, generally FIG. 8-shaped continuous ridge rather than a pair of generally parallel ridges.

Figure 5:
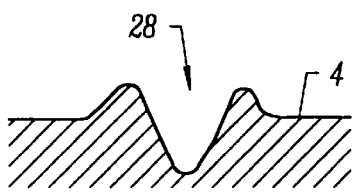
FIG. 5 illustrates a basic V-shaped crater of the type used with the embodiments illustrated in FIGS. 3A–3E.

FIG. 5 illustrates a basic V-shaped crater 28 by a laser beam having the following characteristics. Nd:YVO$_4$ diode pumped, Q-switched laser with wavelength of 1.06 $\mu$m. The repetition rate, pulse width (FWHM) and power setting are: 70 kHz, 70 ms and 2 $\mu$J/pulse.

Figure 5A:
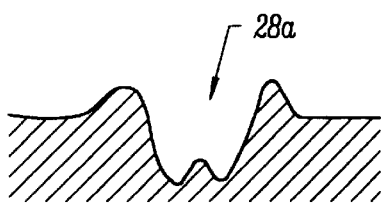
FIGS. 5A and 5B illustrate alternative crater shapes, including the W-shaped crater of FIG. 5A and the M-shaped crater of FIG. 5B, which can be used with the present invention.
Figure 5B:
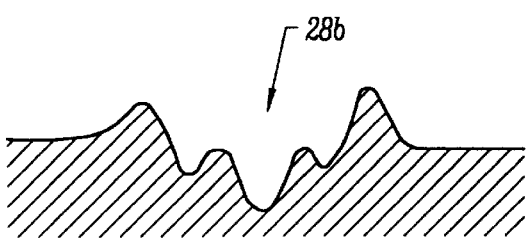

While not typically preferred, other types of craters, such as W-shaped craters 28a and M-shaped craters 28b illustrated in FIGS. 5A and 5B, could also be used with the present invention.

In the preferred embodiment, the laser discharges forming continuous ridges 22 are directed along a spiral path within region 8. Other patterns for continuous ridges 22, such as circular patterns or patterns which cross, such as a set of offset spiral or circular patterns, could also be used.

After formation of continuous ridges 22, the surface is preferably coated with a magnetic overcoat layer, preferably a layer of carbon sputtered onto the surface, to provide a surface with good friction and wear characteristics. Using a larger diameter laser beam, such as 8 to 30 $\mu$m diameter laser beam as opposed to the 5 to 8 $\mu$m diameter laser beam commonly used, reduces the manufacturing complexity because (1) creating the larger diameter laser beam is easier and (2) the need to adjust the laser beam focus, because of the short depth of field present with the smaller diameter laser beams, is reduced or eliminated.

Figure 6:
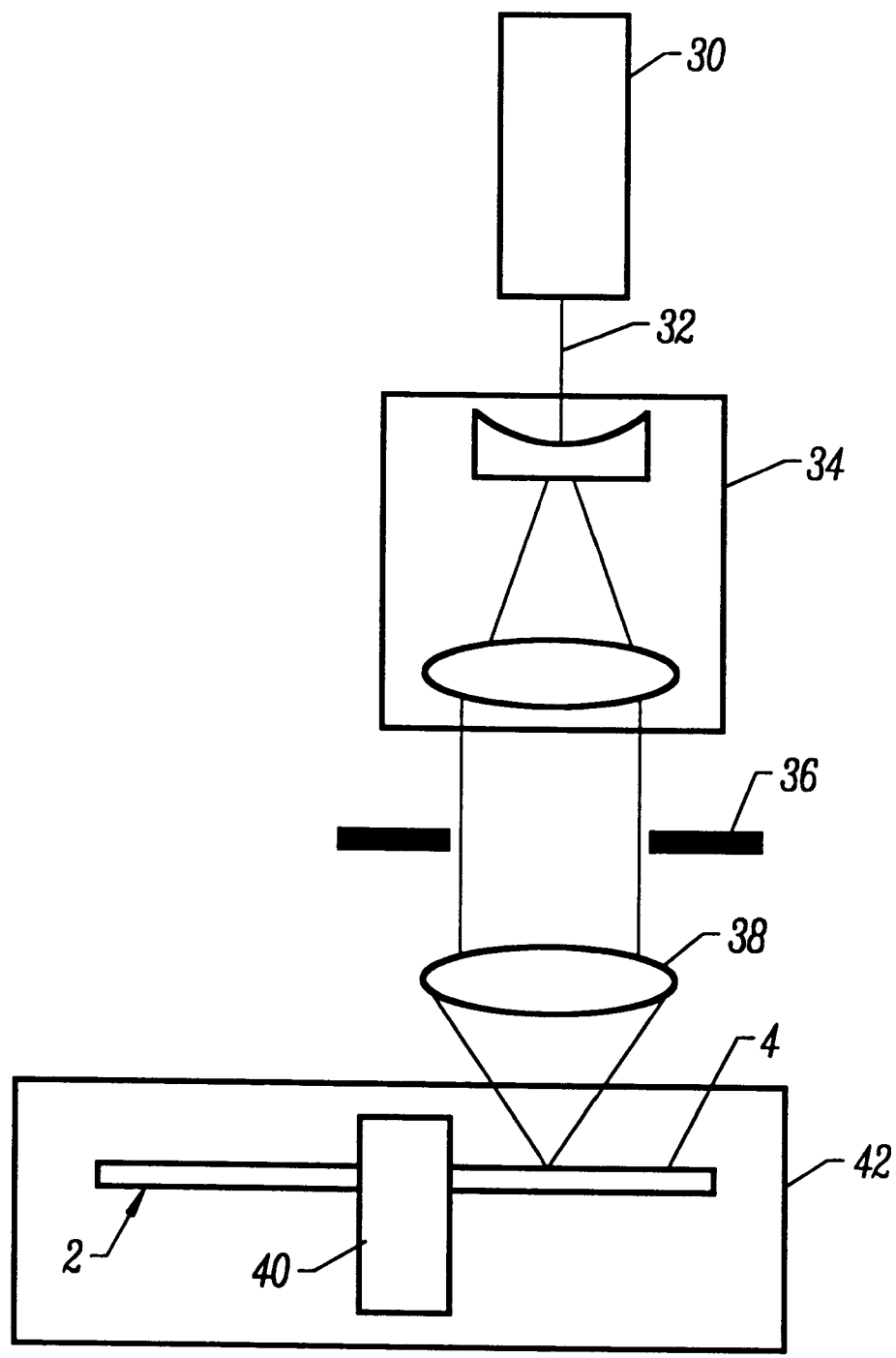
FIG. 6 is a schematic view illustrating apparatus used to create the magnetic disk of FIG. 1 with the continuous ridges of FIG. 3B.

In the example of FIG. 3B, continuous ridges 22 were formed in the following manner. Laser 30, see FIG. 6, is a Nd:YVO$_4$ diode pumped Q-switched solid state laser which is operated at 1.064 $\mu$m wavelength, ~65 ns pulsewidth (FWHM), 70 KHz repetition rate, and 2 $\mu$J/pulse. Laser beam 32 passes through beam expansion optics 34, and a final focus lens 38 to focus the laser beam onto disk surface 4. The focus spot size is determined by the laser wavelength, focus length, and entering beam diameter of final focus lens 38. The focus tolerance (depth of focus) is determined by the focused spot size and laser wavelength. Disk 2 is mounted on a disk spindle 40 supported by a translating linear stage 42. The spacing and orientation of laser induced bumps on disk surface 4 is controlled by the rotation speed of disk spindle 40 and the translation speed of linear stage 42.

To achieve the continuous ridge pattern of FIG. 3B, the focus length of the final focus lens is selected at 60 mm, the entrance beam size is ~4 mm, and the individual laser induce bump size is about 12 $\mu$m (rim diameter of the bump). The rotation speed of the spindle (~610 rpm in this example) is controlled so that the spacing between the centers of adjacent laser discharges is 4 $\mu$m to generate the overlap. The radial spacing between the spiral lines of bumps controlled by the speed of the linear stage (~0.5 mm/sec in this example).

The embodiments of FIG. 3A and 3C–3E were created following essentially the same sequence of events used for the embodiment of FIG. 3B except for changing the center-line spacing of the laser beam discharges.

Modification and variation can be made to the disclosed embodiments without departing from the subject of the invention as defined in the following claims. For example, the invention has been described in terms of a single laser beam 32. The invention could also use multiple laser beams, typically produced by splitting a single laser beam into several laser beams. The multiple laser beams could be designed to strike surface 4 simultaneously or in a staggered manner.

What is claimed is:

1. A magnetic disk comprising:
   a body comprising a disk surface and a center of rotation; and
   said disk surface comprising a data surface region and a head landing zone surface region;
   said head landing zone surface region comprising:
     a base surface; and
     a continuous ridge extending outwardly away from said base surface to an upper edge so the ridge has a height measure between said upper edge and said base surface, said continuous ridge extending along an arcuate path circumscribing the center of rotation.

2. The improved disk according to claim 1 wherein the ridge is a modulated ridge so said height is a varying height.

3. The improved disk according to claim 1 wherein the arcuate path is a spiral path.

4. The improved disk according to claim 1 said head landing zone surface region comprises a plurality of said ridges.

5. The improved disk according to claim 4 wherein said ridges follow a continuous spiral path.

6. The improved disk according to claim 1 wherein the height of said upper edge of said ridge varies from at least about 1 nm to at most about 40 nm.

7. The improved disk according to claim 1 wherein said upper edge of said ridge is a scalloped upper edge.

8. The improved disk according to claim 1 wherein said head landing zone region comprises an outer, sputtered carbon layer.

9. A method for producing landing zone structure at a landing zone surface region of a magnetic disk having a center of rotation comprising the following steps:

directing a series of effectively overlapping laser discharges onto the landing zone surface region; and controlling the laser discharges to form a continuous ridge extending:

outwardly from a base surface of the landing zone surface region; and along an arcuate path circumscribing the center of rotation.

10. The method according to claim 9 wherein said laser discharges have generally circular cross-sectional shapes.

11. The method according to claim 9 wherein said effectively overlapping laser discharges overlap from about 0% to about 99%.

12. The method according to claim 9 wherein said directing step is carried out so the continuous ridge is a modulated ridge so said ridge has a variable height.

13. The method according to claim 9 wherein said laser discharges directing step is carried out using a pulsed laser.

14. The method according to claim 9 wherein said laser discharges directing step is carried out using a continuous wave laser.

15. The method according to claim 9 wherein said laser discharges directing step is carried out using a single laser.

16. The method according to claim 9 further comprising the step of applying a surface coating to said continuous ridge.

17. The method according to claim 16 wherein said surface coating applying step is carried out by sputtering magnetic and protective overcoat layers onto the landing zone surface region.

18. The method according to claim 9 wherein said effectively overlapping laser discharges overlap about 83%.

19. The method according to claim 9 wherein said effectively overlapping laser discharges overlap about 67%.

20. The method according to claim 9 wherein said effectively overlapping laser discharges overlap about 50%.

21. The method according to claim 9 wherein said effectively overlapping laser discharges overlap about 33%.

\* \* \* \* \*